United States Patent

Hobmaier

[11] Patent Number: 5,191,271
[45] Date of Patent: Mar. 2, 1993

[54] PROCESS AND DEVICE FOR ADJUSTING AN AXIS

[75] Inventor: Daniel Hobmaier, Kissing, Fed. Rep. of Germany

[73] Assignee: Kuka Schweissanlagen & Roboter GmbH, Augsburg, Fed. Rep. of Germany

[21] Appl. No.: 741,482
[22] PCT Filed: Dec. 6, 1989
[86] PCT No.: PCT/EP89/01497
§ 371 Date: Sep. 18, 1991
§ 102(e) Date: Sep. 18, 1991
[87] PCT Pub. No.: WO91/08085
PCT Pub. Date: Jun. 13, 1991
[51] Int. Cl.[5] .............................. G05B 1/06
[52] U.S. Cl. .................. 318/568.1; 318/661; 318/603; 901/26; 395/93
[58] Field of Search .............. 318/560–625; 395/80–99; 901/3, 5, 8, 9, 12–23; 341/2, 6

[56] References Cited

U.S. PATENT DOCUMENTS

| | | | |
|---|---|---|---|
| 4,575,666 | 3/1986 | Nakashima et al. | 318/661 |
| 4,578,749 | 3/1986 | Kuno et al. | 364/513 |
| 4,580,086 | 4/1986 | Tokuno et al. | 318/603 |
| 4,593,366 | 6/1986 | Sugimoto et al. | 318/573 X |
| 4,647,827 | 3/1987 | Toyoda et al. | 318/592 |
| 4,780,703 | 10/1988 | Ishida et al. | 341/6 |
| 4,782,275 | 11/1988 | Sakamoto et al. | 318/569 |
| 4,827,203 | 5/1989 | Sakano | 318/667 |
| 4,935,683 | 6/1990 | Kobler et al. | 318/603 |
| 4,988,945 | 1/1991 | Nagase | 324/175 |
| 5,013,988 | 5/1991 | Sakano | 318/602 |
| 5,038,243 | 8/1991 | Gordon | 341/2 |
| 5,040,429 | 8/1991 | Del Castillo | 901/26 X |

Primary Examiner—Paul Ip
Attorney, Agent, or Firm—McGlew and Tuttle

[57] ABSTRACT

The present invention pertains to a process and a device for adjusting an axis, especially an axis of rotation, wherein an adjusting sensor (4) is provided on the axis (2). A position-measuring system (1) with internal cyclic absolute signaling is provided, by means of which the mechanical zero point marking on the axis is reached, and the cyclic absolute actual position value found there is read and entered into the axis control unit (16). Starting from this, the displacement to the desired adjusted position of the adjusting sensor is calculated in the axis control unit (16), and this position is reached with the axis (2) automatically or manually. At this adjustment position, which is located in the middle of a selectable transducer cycle of the position-measuring system, the adjustment of the adjusting sensor (4) is performed.

13 Claims, 1 Drawing Sheet

PROCESS AND DEVICE FOR ADJUSTING AN AXIS

FIELD OF THE INVENTION

The present invention pertains to a process and a device for adjusting an axis, especially an axis of rotation, where many cycles of a drive means, such as a motor, are used to perform one cycle of the axis.

When using position-measuring systems with cyclic, absolute or incremental position transducers, a problem arises in connection with the adjustment of the axis during the operation. Such a readjustment becomes necessary when parts of the control unit are replaced or when the position values carried in the control unit are lost due to disturbance.

It has been known from West German Offenlegungsschrift No. DE-OS 38,32,457 that the mechanical zero point marking on the axis can be scanned to adjust an axis of a cyclic absolute position-measuring system. However, it is sometimes difficult to perform this scanning during normal machine operation. On the one hand, ambient effects, such as external vibration induction, may cause disturbances. On the other hand, attached parts may prevent free access to the measuring site and the mechanical zero point marking.

SUMMARY AND OBJECTS OF THE INVENTION

Therefore, it is the task of the present invention to show a process and a device for adjusting an axis, which permits adjustment with simple and reliable means and also makes possible readjustment during the operation of the machine.

According to the present invention, an adjusting sensor, which represents a substitute for the mechanical zero point marking for the readjustment of the axis during operation is provided at the axis. The adjusting sensor is arranged in an exactly defined, predetermined position of the axis. If the cycle of the position-measuring system is lost, the axis can be readjusted by passing over the adjusting sensor. In this case, the adjusting sensor sends a signal to the axis control unit, which assigns the cycle value known from the adjusting sensor to the position-measuring system at this point. A position-measuring system with a cyclic absolute position transducer is thus completely adjusted. In contrast, a system with an incremental position transducer still requires referencing. The mathematical null of the axis control unit and consequently also the axis can be readjusted with the readjustment of the position-measuring system.

The adjusting sensor is arranged in the working range of the axis such that in the interest of unambiguous signal assignment, it is passed over, if possible, only once. Therefore, it is preferably seated on the limit switch drive mechanism of the axis. It may also be directly or indirectly connected to the axis in another manner, and depending on the size of the working range of the axis. If unambiguous signal assignment has been ensured in another way, the adjusting sensor may also be passed over several times in the working range of the axis.

Thus, the present invention permits simple and rapid readjustment of the axis and the position-measuring system during operation free from ambient effects. In addition, continuous checking of the position-measuring system can also be carried out with it.

The process according to the present invention and the corresponding device are suitable for any type of axes. The preferred field of applications is axes of rotation. Particular advantages are obtained in the case of use for axes of manipulators and multiaxial industrial robots.

The present invention also contains a particularly rapid, reliable, and convenient process for adjusting such an adjusting sensor. This process is performed once prior to shipment and under optimal conditions at the machine manufacturer. It is also performed after replacement of mechanical parts of the machine.

The adjustment process requires a position-measuring system with internal cyclic absolute signaling. This is defined, within the framework of the present invention, that the position transducer of the position-measuring system will deliver, within its cycle, absolute position values which can be read or obtained by incremental counting, depending on the transducer. Via a counter, the position-measuring system determines the number of cycles passed through, and determines the sense of rotation. The position-measuring system thus gives, on the whole, absolute position values if it is adjusted.

The internal cyclic absolute signaling is inherently given for a position-measuring system according to West German Offenlegungsschrift No. DE- OS 38,32,457. A position-measuring system with an exclusively incremental position transducer requires no prior referencing to give cyclic absolute indications.

When the mechanical zero point marking is reached on the axis, the cyclic absolute actual position value is read thanks to the cyclic absolute signaling, fed into the axis control unit, and stored, and the mathematical null is also set for the axis control unit at the same time.

The adjustment position of the adjusting sensor is selectable and depends on mechanical and use-related requirements. The displacement to the adjustment position can be calculated in the axis control unit due to the immediate axis adjustment at the mechanical zero point marking. If maximum convenience is desired, this adjustment position can be reached automatically and controlled by a computer if the program and the axis control unit are designed correspondingly. The second variant of the present invention represents an optimal compromise between programming and control efforts. Thus, the axis is moved into the adjustment position by manual control. In this case, the axis control unit indicates the residual displacement to the operator by a display. Thus, the operator does not have to know the exact incremental value of the adjustment position. When the zero value appears on the display, the adjustment position is calculated to the accuracy of one byte. Thus, the operator will always have the same adjustment process for all types of axes and machine types.

At the adjustment position, the adjusting sensor is adjusted until it sends a switching signal at this point with the necessary precision ($\pm\frac{1}{2}$ cycle). The adjustment process is thus completed, and the arrangement of the axis is completely adjusted.

Particular advantages also arise because the position-measuring system does not have to be adjusted to the mechanical zero point marking of the axis. Its transducer may be fixed in any position in relation to the axis. The transducer may advantageously also be mechanically adjusted to commutation of the drive motor.

The adjusting sensor requires only a very short time for the adjustment process. The adjustment position also must be reached with the axis only once. Furthermore, the absolute position values of the adjusting sensor, of the mechanical and mathematical null, are permanently stored in the control unit, and fixed as a separate data block in the software. In the case of replacement of the control unit, the position values are copied over, so that no readjustment is required. In contrast, when the axis or the drive motors are replaced, readjustment is necessary, but it can be carried out very rapidly, reliably, and conveniently.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
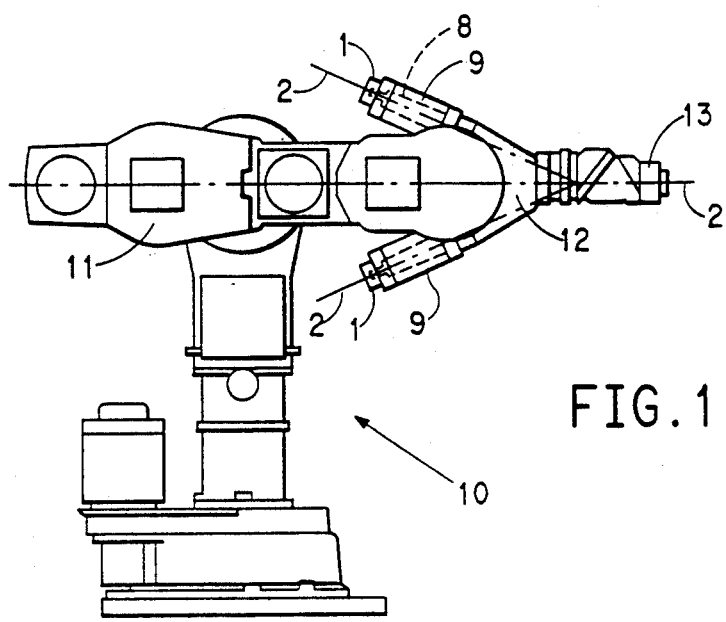
FIG. 1 shows an industrial robot with a plurality of axes, position-measuring systems, and adjusting sensors.

FIG. 1 shows a multiaxial industrial robot 10 with a rocker 11, an extension arm 12, and a robot hand 13. The various parts of the robot hand 13 are actuated via three axes 2, which are expanded at the end at the extension arm 12 and driven by means of brushless three-phase motors 9. The rotation axes 2 are extended in the rotor shafts 8, at the end of which a position-measuring system 1 is arranged. Both the absolute rotation position of the axes 2 and the angular position of the rotor shaft 8 with its permanent magnets are measured via the position-measuring system 1 in relation to the external rotary field windings, and reported to the control device of the industrial robot 10. A plurality of axis control units 16 are integrated in the robot's control unit.

A limit switch drive mechanism 6, at the end stage 7 of which an adjusting sensor 4 is adjustably arranged between limit switches 14, is arranged on each axis 2. The limit switches 14 limit the working range of the axis 2. The limit switch drive mechanism 6 has an appropriate number of stages for this.

Figure 2:
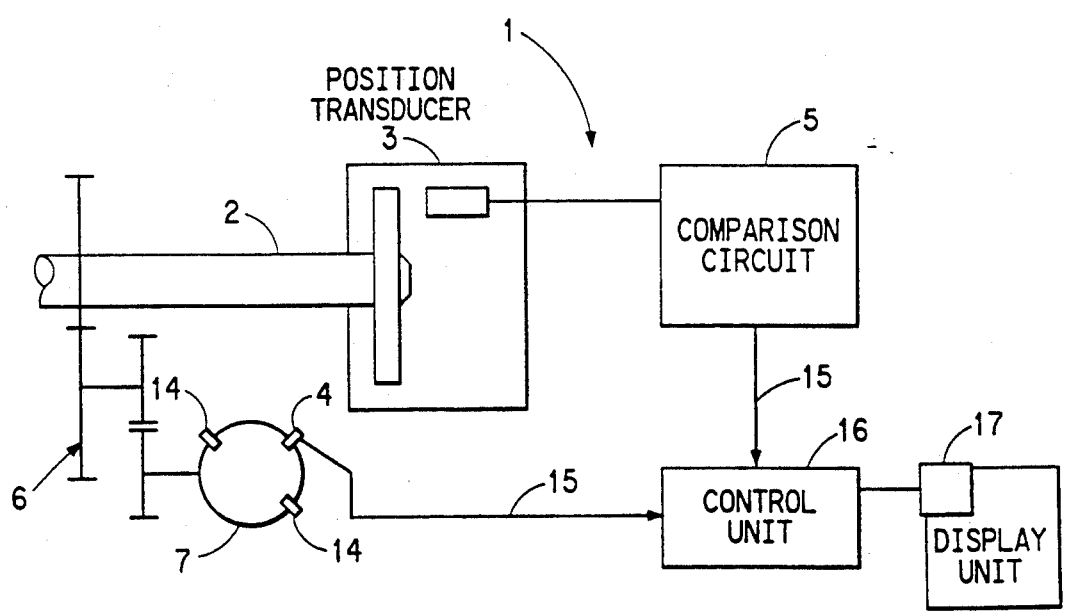
FIG. 2 shows a schematic circuit diagram of the position-measuring system and the adjusting sensor.

The end stage 7 is shown rotated in FIG. 2. The adjusting sensor 4 is mounted adjustably in a curved slot guide and can be clamped in the desired position by means of screws.

The adjusting sensor may have different designs, e.g., as a mechanical tracer or a contactless switch. In the preferred embodiment, it consists of a photocell arrangement. The adjusting sensor 4 is connected to the axis control unit 16 or the robot's control unit via a signal line 15.

The adjusting sensor is used to provide a new cycle value for the position-measuring system 1 and the axis control unit 1 if the old value has been lost due to disturbance. Therefore, the adjusting sensor needs to switch only accurately enough to ensure that its signal will be within the predetermined position transducer cycle with certainty. A switching accuracy of $\pm\frac{1}{2}$ cycle is sufficient. The adjustment position for which the adjusting sensor is to send its switching signal is therefore preferably set to the middle of the transducer cycle.

The desired number of transducer cycles is freely selectable. It depends on whether the position-measuring system 1 is seated directly on the axis 2, i.e, on the driven end of the axis, or on the drive, which rotates at a higher speed. In the embodiment shown, the adjusting sensor 4 is arranged in the middle of the working range of the axis. The cycle number may also be set to the position of the mechanical zero point marking, i.e., the zero value.

The position transducer 3 in the position-measuring system 1 sends cyclic absolute signals. The position transducer 3 can consequently be designed as a cyclic absolute position transducer corresponding to West German Offenlegungsschrift DE-OS 38,32,457. Such a position transducer 3 has, for example, an absolute value disk connected to the axis 2. The absolute value disk is coded and indicates $2^n$ different positions, e.g., 1024 positions. Consequently, the position transducer 3 indicates one absolute position value for each position of the axis within the cycle.

As an alternative, it is also possible to use an incremental position transducer 3. In this transducer, all the increments have equal rights, and are counted through in sequence for position or displacement determination, and a null impulse is sent for cycle counting via a second track. Cyclic absolute display of the transducer can also be achieved here by prior referencing. The null impulse of the position transducer, which is mechanically adjusted to the axis 2, is sought, and the increment counter is set to "0".

The entirely absolute axis position is composed of two pieces of information. One of them is the absolute position value within the cycle, which is reported by the position transducer 3. The other piece of information is the number of cycles. In both of the above-mentioned variants of the position transducer 3, the number of cycles performed is fixed via the comparison circuit 5, and the sense of rotation is also determined, so that an absolute position value is ultimately reported by the adjusted position-measuring system 1 to the axis control unit 16 via the signal line 15. According to West German Offenlegungsschrift No. DE-OS 38,32,457, the comparison circuit 5 can also be designed with a memory and a counter, and can function in the prior-art manner. The comparison circuit may be realized as hardware or software and be integrated in the machine's control unit.

The process involved in the adjustment of the axis 2 and the adjustment of the adjusting sensor 4 takes place as described below:

The robot manufacturer first selects the cycle of the position-measuring system 1 in which the adjusting sensor 4 is to perform the switching. If a position-measuring system with an incremental position transducer is used, this is referenced in order to obtain a cyclic absolute position display.

The mechanical zero point marking is subsequently located and scanned on the axis. This is preferably done by means of an electronic height tracer. The cyclic absolute position value is read at the zero point marking, entered into the axis control unit, and stored there. The cycle count is set at the same time, preferably to zero value. The mathematical null for the computer control is also set. The axis is thus marked.

The displacement from the mechanical zero point marking to the desired adjustment position is calculated in the axis control unit. The desired adjustment position is preferably in the middle of a transducer cycle.

The adjustment position is subsequently reached by manual control or automatically. In the case of manual control, the difference between the previously calculated displacement to the adjustment position and the distance already traveled is calculated in the computer of the axis control unit. The axis control unit 16 has a display unit 17, on which the remaining distance yet to be traveled is displayed for the operator. When the adjustment position is reached automatically, the axis control unit 16 performs the positioning of the axis 2.

The axis 2 stops at the adjustment position. A switching contact, which is moved together with the movements of the axis, is provided in the end stage 7 of the limit switch drive mechanism 6. The adjusting sensor 4 is adjusted to this switching contact by displacement such that it will generate the switching signal precisely in the predetermined adjustment position.

The distances between the mechanical zero point markings, on the one hand, and the adjustment position or switching position of the adjusting sensor, as well as from the mathematical null, and the cyclic absolute position value of the transducer at the mechanical zero point marking, on the other hand, are stored in the axis control unit 16. The position-measuring system can be readjusted with these values in the case of loss of the cycle count. To do so, the axis 2 is moved until the adjusting sensor 4 will switch. In this position of the axis, the cycle count in the position-measuring system is reset with the cycle value known from and predetermined by the adjustment position. This can be done without problems at the site of use of the industrial robot 10. Referencing via the null impulse is also necessary in the case of an incremental position transducer.

Since the adjusting sensor 4 is arranged in the working range of the axis 2 and is passed over every time, it can also be used as a permanent reference check for checking the accuracy of the cyclic position values. On arrival of its switching impulse, a comparison is performed in the axis control unit 16 to determine whether the cycle count reported by the position- measuring system indeed corresponds to the cycle count of the sensor position.

While a specific embodiment of the invention has been shown and described in detail to illustrate the application of the principles of the invention, it will be understood that the invention may be embodied otherwise without departing from such principles.

I claim:

1. A process for adjusting an axis, the process comprising the steps of:
   providing a mechanical zero point on the axis;
   providing a position-measuring system with internal cyclic absolute signaling for measuring movement of the axis away from said mechanical zero point;
   providing an adjusting sensor on said axis;
   moving the axis to said mechanical zero point;
   entering a cyclic absolute actual position value of said position measuring system into an axial control unit when the axis is at said mechanical zero point;
   calculating a desired adjustment position of said adjusting sensor in said axis control unit;
   moving the axis to said desired adjustment position;
   adjusting said adjusting sensor to said desired adjustment position.

2. Process in accordance with the claim 10 wherein: the desired adjustment position of the adjusting sensor is located in a middle of a selectable transducer cycle of the position-measuring system.

3. Process in accordance with claim 10 wherein: an incremental position-measuring system is referenced on the axis to a cyclic absolute display before the mechanical zero point is reached.

4. Process in accordance with claim 10, wherein: the desired adjustment position is reached by moving the axis manually, and a residual displacement is calculated by the axis control unit and optically displayed.

5. Process in accordance with claim 10 wherein: the axis is moved by the axis control unit automatically into the desired adjusted position.

6. A device for adjusting an axis, the device comprising:
   a mechanical zero point on the axis;
   a position-measuring means for measuring movement of the axis away from said mechanical zero point;
   an adjusting sensor means adjustably arranged on the axis at a desired adjustment position and for indicating when the axis is at said desired adjustment position;
   an axis control means for calculating and storing a distance from said mechanical zero point to said desired adjustment position, said axis control unit receiving said inclination from said adjusting sensor means, and readjusting said position measuring means when said adjusting sensor means indicates that the axis is at said desired adjustment position.

7. Device in accordance with claim 11, wherein: the axis has a limit switch drive mechanism, at the end stage arranged with the adjusting sensor means.

8. Device in accordance with claim 11, wherein: the position-measuring means has one of an incremental and cyclic absolute position transducer.

9. Device in accordance with claim 11, wherein: the axis control means has a display means for displaying incremental position values.

10. A device for determining a position of an axis, the device comprising:
    a first part of the axis;
    a second part of the axis;
    moveable connection means for movably connecting said first part of the axis to said second part of the axis;
    drive means for driving said first part of the axis into movement with respect to said second part of the axis, said drive means performing a plurality of repetitive drive cycles in order to move said first part of the axis through one axis cycle with respect to said second part of the axis;
    mechanical zero point means on said drive means and for indicating a mechanical zero position of the drive means;
    measurement means for measuring angular position of said drive means within one of said plurality of drive cycles and for counting a number of said plurality of drive cycles formed from said mechanical zero position;
    an adjusting sensor means on the axis and for indicating when said second part of the axis is in an unambiguous desired adjustment position with respect to said first part of the axis during said axis cycle;
    axis control means for controlling said drive means to control a demanded position of said first part of the axis with respect to said second part of the axis, said axis control means counting said number of plurality of drive cycles performed from said mechanical zero position, and monitoring said angular position to determine when said first part of the axis is in said demanded position, said axis control means having a readjustment means for calculating and storing a number of said drive cycles from said mechanical zero position to said desired adjustment position, and readjusting said number of plurality of drive cycles performed from said mechanical zero position when the axis is at said desired adjustment position.

11. A device in accordance with claim 10, further comprising:
limit switch means for limiting a size of said axis cycle to include said desired adjustment position and to exclude said drive means from achieving said mechanical zero position.

12. A device in accordance with claim 10, wherein:
said adjusting sensor means has an accuracy of approximately $+/-\frac{1}{2}$ of said drive cycle.

13. A device in accordance with claim 10, wherein:
said adjusting sensor means includes an electric switch.

* * * * *